United States Patent [19]
Kubo et al.

[11] Patent Number: 5,632,363
[45] Date of Patent: May 27, 1997

[54] ONE-WAY CLUTCH

[75] Inventors: Tomomasa Kubo, Kashiwara; Tetsuaki Numata, Nara-ken; Yoshihisa Miura, Yamatokoriyama, all of Japan

[73] Assignee: Koyo Seiko Co., Ltd., Japan

[21] Appl. No.: 630,889

[22] Filed: Apr. 2, 1996

[30] Foreign Application Priority Data

Apr. 21, 1995 [JP] Japan ................... 7-120890
Apr. 21, 1995 [JP] Japan ................... 7-120891

[51] Int. Cl.⁶ .................................................. F16D 41/07
[52] U.S. Cl. .......................... 192/45.1; 192/41 A; 188/82.8
[58] Field of Search ..................... 192/45.1, 41 A; 188/82.8

[56] References Cited

U.S. PATENT DOCUMENTS 4,875,564 10/1989 Leitz et al. ................ 192/45.1
5,016,741 5/1991 Leitz ......................... 192/45.1
5,471,890 12/1995 Shiga et al. .................. 192/45 X

*Primary Examiner*—Andrea L. Pitts
*Attorney, Agent, or Firm*—Adams & Wilks

[57] ABSTRACT

A one-way clutch according to the present invention comprises an outer race fitted in a housing member, an inner race, a plurality of engaging members arranged between the outer race and the inner race, a cage for holding the engaging members, a spring for biasing each of the engaging member in one direction, annular members arranged on the opposite sides of the outer race so as to close a space between the inner and outer races, said inner race being formed of metal, one of said annular members being formed of synthetic resin, and an integral molding means for integrally forming the inner race and the annular member. According to a further embodiment, one annular member and the cage are integrally molded with synthetic resin.

8 Claims, 5 Drawing Sheets

ONE-WAY CLUTCH

FIELD OF THE INVENTION

The present invention relates to a one-way clutch. More specifically, the invention relates to a one-way clutch which is used for an automatic speed change gear, a torque converter, and the like for an automobile and which facilitates handling in assembly, is light-weighted and is miniaturized.

BACKGROUND OF THE INVENTION

FIG. 9 show one example of a conventional one-way clutch used for a torque converter or the like of an automobile. The one-way clutch shown in FIG. 9 comprises an outer race 50 press-fitted and secured to a stator 56 by spline-fitting or the like, an inner race 51, a plurality of sprags arranged between the inner and outer races 51 and 50, an outer cage 53 and an inner cage 54 for holding the sprags 52, a spring 55 for biasing the sprags 52 in one direction, and annular retainer 57 arranged on one side of the outer race 50 and secured to the stator 56, etc.

On one side of the outer race 50 is arranged the annular retainer 57 so as to close a space between the inner and outer races 51 and 50. This annular retainer 57 has an outside diameter larger than an inside diameter of the outer race 50 and an inside diameter smaller than an inside diameter of the inner race 51. This annular retainer 57 rotates relatively to the fixed inner race 51 and is sometimes moved axially by an axial load. For this reason, a thrust needle bearing 65 in contact with a torque converter fixing portion (not shown) is held on the outer surface of the annular retainer 57.

The annular retainer 57 is formed at an outer peripheral portion and an inner peripheral portion of an inner surface 57a thereof with shoulders 58 and 59, and an end of the outer race 50 and an end of the inner race 51 are respectively loosely fitted therein. With this, the inner surface 57a of the annular retainer 57 is positioned within the space between the inner and outer races 51 and 50. Further, a portion between the inner and outer races 50 and 51 on the opposite side where the retainer 57 is arranged is closed by an annular retainer 60 formed integrally as a part of the stator 56. The annular retainer 60 has an inside diameter smaller than the outside diameter of the inner race. The annular retainer 60 is formed at an inner peripheral portion of an inner surface 60a thereof with a shoulder 61, and an end of the inner race 51 is loosely fitted therein.

The inner race 51 is formed at the inner peripheral surface with a spline 64 fitted in a spline 63 formed in a tubular fixed shaft 62.

According to a further example of the conventional one-way clutch, annular retainers 77 and 78 secured to a stator 76 are arranged on opposite sides of an outer race 70 as shown in FIG. 10. On the opposite sides of the outer race 70 are arranged the annular retainers 77 and 78 having an outside diameter larger than an inside diameter of the outer race 70 and an inside diameter smaller than an outside diameter of the inner race 71 so as to close a space between the inner and outer races 71 and 70. A bearing in contact with an opposed torque converter fixing portion is held on the outer surface of the annular retainer.

The annular retainers 77 and 78 are formed at an outer peripheral end and an inner peripheral portion of inner surfaces 77a and 78a thereof with shoulders 79, 80, 81 and 82, respectively, and an end of the outer race 70 and an end of the inner race 71 are loosely fitted therein. With this, the inner surfaces 77a and 78a of the annular retainers 77 and 78 are positioned within the space between the inner and outer races 71 and 70. The retainers 77 and 78 are axially secured by snap rings 83 and 84 stopped at the stator 76.

In the former example, the inner race 51 is formed at the inner peripheral surface with the spline 64. However, since the inner race 51 is made of metal such as bearing steel, carbon steel, etc., the number of processing for the spline 64 increases. Further, the number of assembling parts of the one-way clutch to a housing of the stator 56 or the like is large.

For achieving the recent demand for the trend of spacesaving, light-weighting and the like for the torque converter and the like of an automobile, the one-way clutch used for the torque converter and the like has a tendency in which an axial space thereof is controlled. In the latter example, the annular retainers 77 and 78 made of aluminum serve to cope with axial locating of the one-way clutch and maintenance of a diametral clearance between the inner and outer races 71 and 70 so as to response to the demand for the space-saving. However, since the inner surfaces 77a and 78a of the annular retainers 77 and 78 are positioned within the space between the inner and outer races 71 and 70, the axial spacing between the inner surfaces 77a and 78a is small. Therefore, it is not possible to make the axial length of the cages 73 and 74 long. As a result, the axial length of the sprags 72 held by the cages 73 and 74 is short, making it difficult to have a sufficient torque capacity.

SUMMARY OF THE INVENTION

An object of the present invention is to provide a one-way clutch capable of reducing the number of processing for processing an inner race of a one-way clutch and the number of processing for assembling parts of the one-way clutch to a housing.

A further object of the present invention is to provide a one-way clutch which will not lower a torque capacity of the one-way clutch, can cope with the control of an axial space and can achieve the reduction in weight.

According to one embodiment of the present invention, a one-way clutch comprises an outer race fitted in a housing member, an inner race, a plurality of engaging members arranged between the outer race and the inner race, a cage for holding the engaging members, a spring for biasing each of the engaging member in one direction, annular members arranged on the opposite sides of the outer race so as to close a space between the inner and outer races, said inner race formed of metal, one of said annular members being formed of synthetic resin, and an integral molding means for integrally forming the inner race and the annular member.

In the one-way clutch, since the inner race made of metal and the annular member made of synthetic resin are integrally molded, handling when assembled is easy. Further, a spline for fitting with a spline shaft is molded integral with a tubular portion of the annular member made of synthetic resin to thereby enable the reduction in the number of processings for processing to the inner race. Further, since a swivel-stop means is arranged on the joining surface between the tubular portion of the annular member and the inner race, there provides an effect that the skid of the inner race and the annular member can be positively prevented.

According to a further embodiment, the one-way clutch comprises an outer race fitted in a housing member, an inner race, a plurality of engaging members arranged between the outer race and the inner race, a cage for holding the engaging members, a spring for biasing each of the engaging member in one direction, annular members arranged on the opposite sides of the outer race so as to close a space between the inner and outer races, and an integrally molding means for integrally molding one of said annular members and said cage with synthetic resin.

Since the annular member and the cage of the one-way clutch are integrally molded with synthetic resin as described above, an axial dimension can be reduced. Moreover, since the synthetic resin is used, the weight can be reduced. Further, there is an effect in that if the extreme end of the cage is connected by an annulus, the rigidity of the cage increases.

DESCRIPTION OF THE PREFERRED EMBODIMENTS

Figure 1:
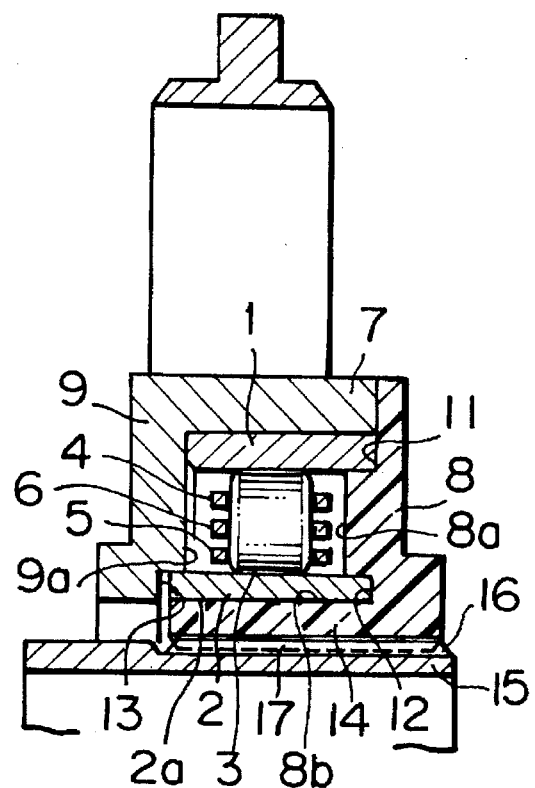
FIG. 1 a longitudinal sectional view of a one-way clutch according to a first embodiment of the present invention.
Figure 2A:
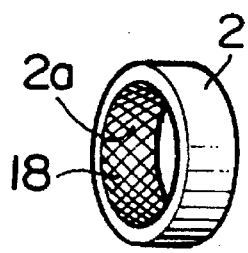
FIG. 2A an exploded perspective view of an inner race according to the first embodiment of the present invention.
Figure 2B:
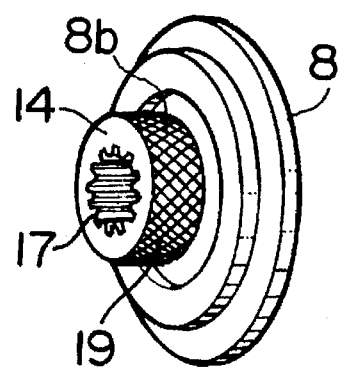
FIG. 2B is an exploded perspective view of an annular retainer according to the first embodiment of the present invention.

The first embodiment of the present invention will be explained with reference to FIG. 1, FIG. 2A and FIG. 2B. The one-way clutch comprises an outer race 1 press-fitted and secured to a stator 7 by spline-fitting or the like, an inner race 2, a plurality of sprags 3 arranged between the inner and outer races 2 and 1, an outer cage 4 and an inner cage 5 for holding the sprags 3, a spring 6 for biasing the sprags 3 in one direction, and annular retainers 8, 9 arranged on opposite sides of the outer race 1, etc. On the opposite sides of the outer race 1 is arranged one of said annular retainers 8 having an outside diameter larger than an inside diameter of the outer race 1 and an inside diameter smaller than an outside diameter of the inner race 2 so as to be closed between the inner and outer races 2 and 1.

The annular retainer 8 is formed at an outer peripheral surface and an inner peripheral surface of an inner surface 8a thereof with shoulders 11 and 12 having an L-shape section, and an end of the outer race 1 and an end of the inner race 2 are loosely fitted therein. With this, the inner surface 8a of the annular retainer 8 is positioned within the space between the inner and outer races 2 and 1. The other annular retainer 9 is integrally formed as a part of the stator 7 to close the space between the inner and outer races 2 and 1, the annular retainer 9 having the inside diameter smaller than the outside diameter of the inner race 2. The annular retainer 9 is formed at an inner peripheral portion of an inner surface 9a thereof with a shoulder 13 having an L-shape section, and the end of the inner race 2 is loosely fitted therein.

The inner race 2 is made of metal such as bearing steel or carbon steel, and one annular retainer 8 is made of synthetic resin, the inner race 2 and the annular retainer 8 being integrally formed. Because of this, the annular retainer 8 is not connected to the stator 7. Specifically, the annular retainer 8 is formed at its inner peripheral portion with a tubular portion 14, and the tubular portion 14 is integrally formed at its outer peripheral portion with the inner race 2. Further, the tubular portion 14 is integrally formed, when the resin is molded, at its inner peripheral surface with a spline 17 fitted in a spline 16 formed on a tubular fixed shaft 15.

As described above, since the annular retainer 8 is in the fixed state together with the inner race 2, it is not axially moved due to the axial load. A thrust needle bearing as in prior art is not necessary, thus reducing the number of parts.

The inner race 2 and the annular retainer 8 are integrally molded. However, as shown in FIGS. 2A and 2B, the inner peripheral surface of the inner race 2, that is, a joining surface 2a, and the outer peripheral surface of the annular retainer 8, that is, a joining surface 8b, are applied with mesh(of a net)-like knurl-processing portions 18, 19 as swivel-stop means, respectively. Various kinds of configurations other than the meshes of a net such that the rugged portions on the circumference may be subjected to knurl-processing can be applied. While in this embodiment, both the inner race and the annular retainer 8 are formed with the swivel-stop mechanism, it is to be noted that such a mechanism may be formed on at least one of them.

The other annular member 9 is formed of synthetic resin or aluminum alloy, etc.

Figure 3:
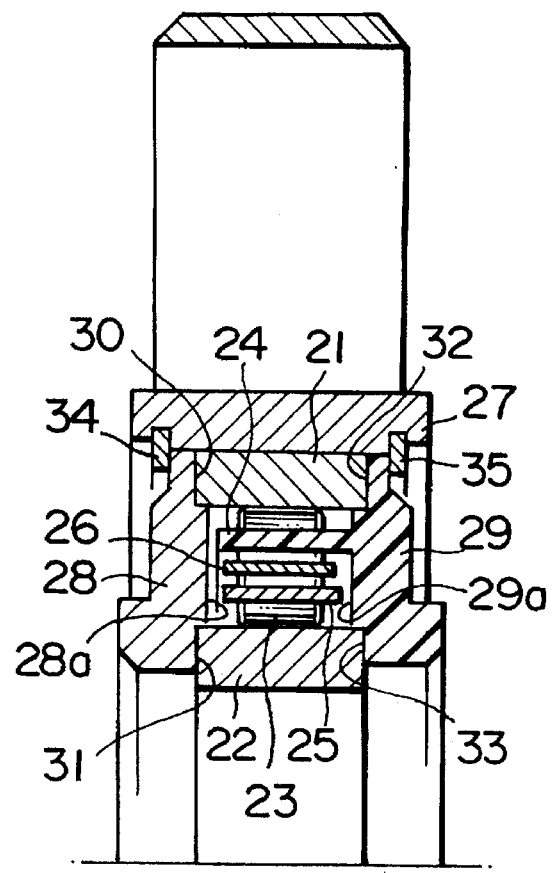
FIG. 3 is a longitudinal sectional view of a one-way clutch according to second embodiment of the present invention.

The second embodiment of the present invention will be explained with reference to FIGS. 3 to 5. As shown in FIG. 3, the one-way clutch according to the second embodiment basically comprises an outer race 21 press-fitted and secured to a stator 27 by spline-fitting or the like, an inner race 22, a plurality of sprags 23 arranged between the inner and outer races 22 and 21, an outer cage 24 and an inner cage 25 for holding the sprags 23, a spring 26 for biasing the sprags 23 in one direction, and annular retainers 28, 29 arranged on opposite sides of the outer race 21, etc.

On the opposite sides of the outer race 21 are arranged the annular retainers 28 and 29 having an outside diameter larger than an inside diameter of the outer race 21 and an inside diameter smaller than an outside diameter of the inner race 22 so as to close a space between the inner and outer races 21 and 22. Bearings in contact with opposed mating members not shown are fixedly held on the outer sides of the annular retainers 28 and 29.

The annular retainers 28 and 29 are formed at an outer peripheral end and an inner peripheral portion of inner surfaces 28a and 29a thereof with shoulders 30, 31, 32 and 33 having an L-shape section, and an end of the outer race 21 and an end of the inner race 22 are loosely fitted therein. With this, the inner surfaces 28a and 29a of the annular retainers 28 and 29 are positioned within the space between the inner and outer races 21 and 22.

Figure 4:
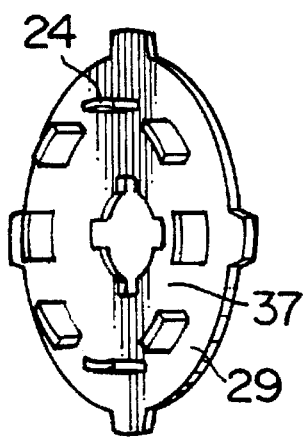
FIG. 4 is a perspective view of a cage and an annular retainer according to the second embodiment of the present invention.
Figure 5:
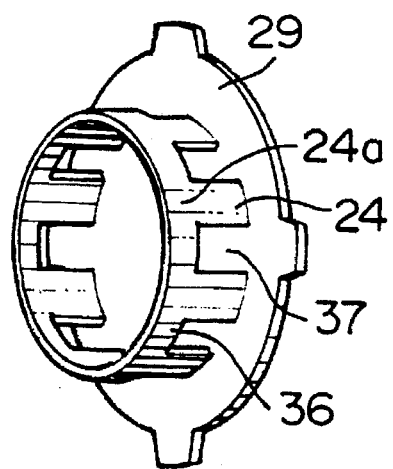
FIG. 5 is a perspective view showing a modification of a cage and an annular retainer according to the second embodiment of the present invention.

One annular retainer 29 and the outer cage 24 are integrally molded with synthetic resin as shown in FIG. 4 in detail. The other annular retainer may be formed of synthetic resin or aluminum. While the inner cage 25 is formed independently as in prior art, it is to be noted that the inner cage 25 together with the outer cage 24 can be formed with synthetic resin integral with the annular retainer 29, if necessary. Further, the outer cage 24 can be formed independently, and only the inner cage 25 can be formed with synthetic resin integral with the annular retainer 29. Reference numeral 37 designates a pocket for holding the sprags 23.

When the outer cage 24 and the annular retainer 29 are integrally molded with synthetic resin, if the extreme end 24a of the outer cage 24 is connected by an annulus 36 formed integral with the outer cage 24 with synthetic resin, the rigidity of the outer cage 24 further improves.

Figure 6:
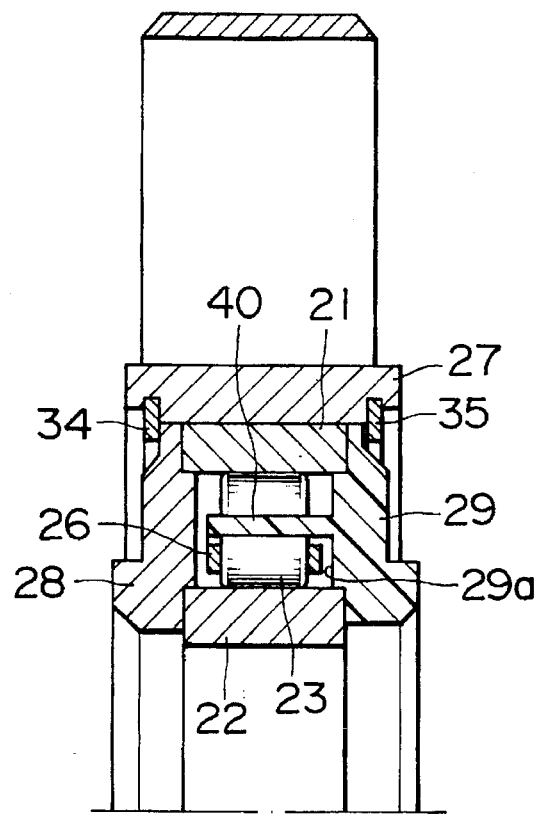
FIG. 6 is a longitudinal sectional view of a one-way clutch according to a third embodiment of the present invention.

The third embodiment of the present invention will be explained with reference to FIG. 6. In the one-way clutch according to this embodiment, a cage 40 for holding the sprags 23 is formed from a single cage to simplify the construction. The cage 40 is molded integral with the annular retainer 29 with synthetic resin. Other constructions and operations are similar to those of the second embodiment, description of which is therefore omitted while affixing the same reference numerals.

Figure 7:
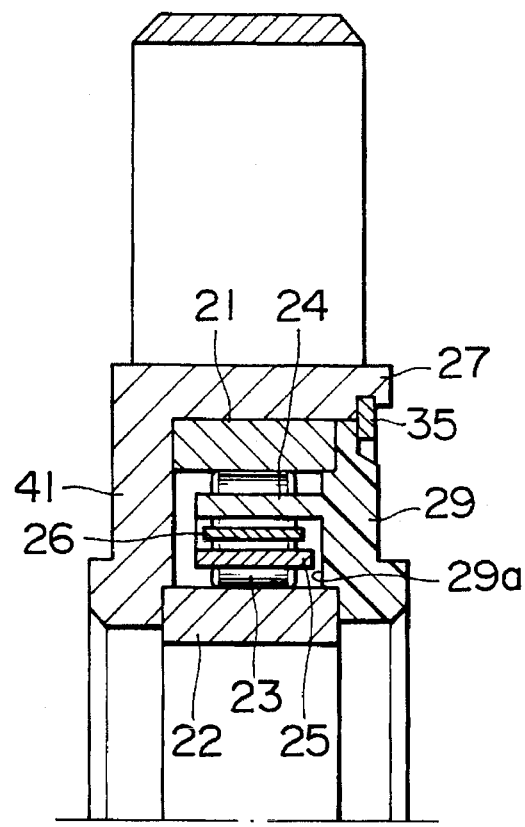
FIG. 7 is a longitudinal sectional view of a one-way clutch according to a fourth embodiment of the present invention.

The fourth embodiment of the present invention will be explained with reference to FIG. 7. In the one-way clutch according to this embodiment, the other retainer 41 not formed integral with the outer cage 24 is formed integral with the stator 27 to facilitate the assembly. Other constructions and operations are similar to those of the second embodiment, description of which is therefore omitted while affixing the same reference numerals.

Figure 8:
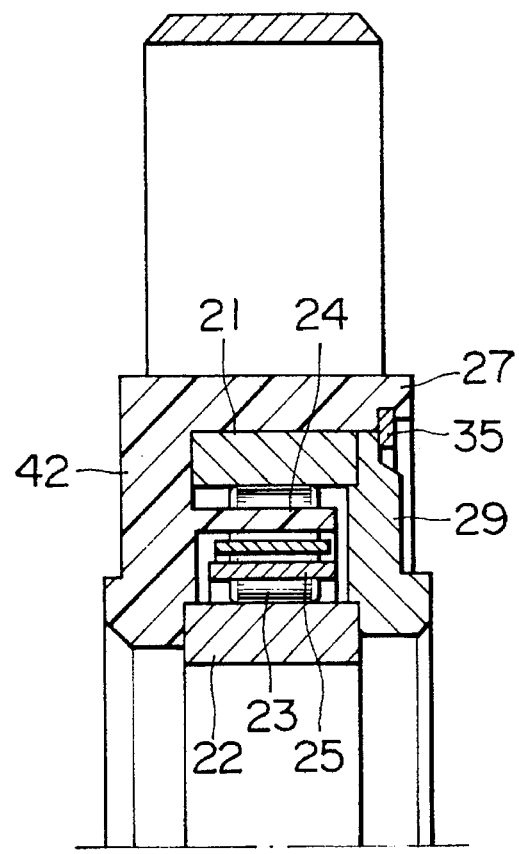
FIG. 8 is longitudinal sectional view showing a one-way clutch according to a fifth embodiment of the present invention.
Figure 9:
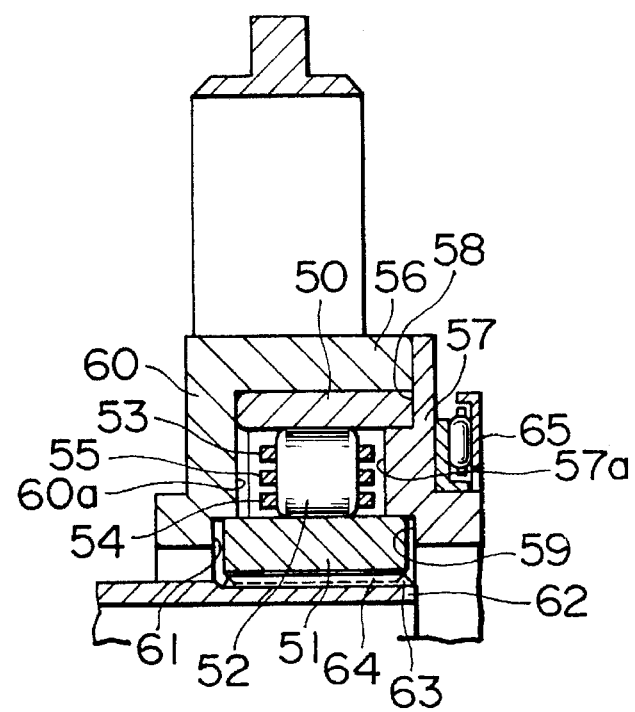
FIG. 9 is a longitudinal sectional view of a conventional one-way clutch.
Figure 10:
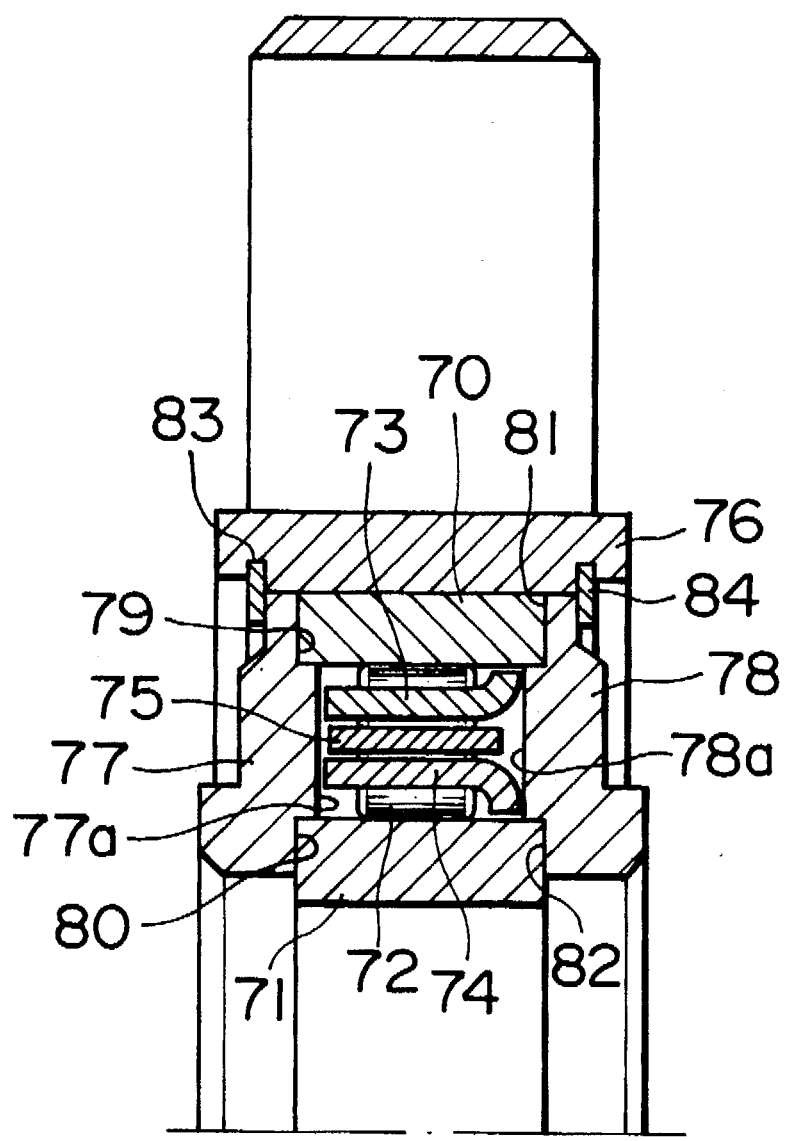
FIG. 10 is a longitudinal sectional view of a further conventional one-way clutch.

The fifth embodiment of the present invention will be explained with reference to FIG. 8. In the one-way clutch according to this embodiment, the stator 27, the annular retainer 42 and the outer cage 24 are integrally formed with synthetic resin to reduce the weight and facilitate the assembly of the one-way clutch. Other constructions and operations are similar to those of the second embodiment, description of which is therefore omitted while affixing the same reference numerals.

We claim:

1. A one-way clutch comprising an outer race fitted in a housing member, an inner race, a plurality of engaging members arranged between the outer race and the inner race, a cage for holding the engaging members, a spring for biasing each of the engaging member in one direction, annular members arranged on (the opposite sides) of the outer race so as to close a space between the inner and outer races, said inner race being formed of metal, one of said annular members being formed of synthetic resin, and an integral molding means for integrally forming the inner race and the annular member.

2. The one-way clutch according to claim 1, wherein said housing member is a stator.

3. The one-way clutch according to claim 1, wherein the inner peripheral portion of said annular members made of synthetic resin is formed into an axially extending tubular portion, and said inner race being molded integral with the outer peripheral portion of said tubular portion.

4. The one-way clutch according to claim 1, wherein a spline fitted in a spline shaft is formed in the inner peripheral surface of the tubular portion of said annular member.

5. The one-way clutch according to claim 1, wherein a swivel-stop means is applied to at least one of the joining surfaces between said annular member and said inner race.

6. A one-way clutch comprising an outer race fitted in a housing member, an inner race, a plurality of engaging members arranged between the outer race and the inner race, a cage for holding the engaging members, a spring for biasing each of the engaging member in one direction, annular members arranged on the opposite sides of the outer race so as to close a space between the inner and outer races, and an integral molding means for integrally molding one of said annular members and said cage with synthetic resin.

7. The one-way clutch according to claim 6, wherein said housing member is a stator.

8. The one-way clutch according to claim 6, wherein the extreme end of said cage is connected by an annulus molded integral with said cage with synthetic resin.

\* \* \* \* \*